United States Patent [19]

Mericle

[11] 4,230,164
[45] Oct. 28, 1980

[54] NESTED TEMPLATE SYSTEM FOR CUTTING ONE PIECE CLOSED FRAMES AND METHOD THEREFOR

[76] Inventor: John E. Mericle, 10528 Camino Palo Verde, Tucson, Ariz. 85715

[21] Appl. No.: 11,139

[22] Filed: Feb. 12, 1979

[51] Int. Cl.³ ............................................... B27C 5/10
[52] U.S. Cl. .............................. 144/134 D; 33/174 B; 144/144 R; 144/144.5 R; 144/323
[58] Field of Search .................. 144/144R, 144.5, 323, 144/2 R, 326 R; 33/27 R, 27 L, 27 K, 174 B; 409/125, 130, 182

[56] References Cited
U.S. PATENT DOCUMENTS

| 99,201 | 1/1870 | Jenkins | 144/144.5 |
| 174,212 | 2/1876 | Doane | 144/144.5 |
| 2,838,838 | 6/1958 | Lica | 144/144 R X |
| 3,393,453 | 7/1968 | Stoneman | 33/27 K |
| 3,726,327 | 4/1973 | Cormier | 144/144 S |

*Primary Examiner*—W. Donald Bray
*Attorney, Agent, or Firm*—Cahill, Sutton & Thomas

[57] ABSTRACT

Each of a plurality of nested templates are attached concentric to one another in spaced apart relationship to a common sheet of material to define a plurality of concentric bands on the surface of the sheet. The sheet is cut away coincident with each band by a router or the like guided by adjacent templates edges to leave closed frames corresponding in size to the attached template and ready for finishing upon detachment of the template.

13 Claims, 6 Drawing Figures

NESTED TEMPLATE SYSTEM FOR CUTTING ONE PIECE CLOSED FRAMES AND METHOD THEREFOR

The present invention relates to jigs and, more particularly, to a plurality of nested templates for one piece closed frames.

In the woodworking art, templates and jigs of various types have been developed over the years to fashion work pieces. To cut rectangular work pieces, fully adjustable jigs, such as those disclosed in U.S. Pat. Nos. 2,652,866, 3,857,670 and 3,985,168 are known. Herein, four sides are interlockable with one another to define rectangles having a wide range of length and width. Inserts are also useable therewith to modify the shape of the cuts made at the corners. U.S. Pat. Nos. 3,199,556 and 3,540,130 are directed to adjustable frameworks for supporting a template adjacent a work piece to be cut. U.S. Pat. Nos. 2,957,507, 3,519,043, 3,738,013 and 3,782,431 show various devices for supporting a router with respect to a work piece. U.S. Pat. No. 2,741,284 describes a clamp for maintaining a jig in place.

Frames, particularly frames for pictures, are conventionally fabricated from four pieces of material which must be mitered and carefully joined to define a rectangular frame. To make good and true frames, substantial expertise is required and the work is time consuming. To incorporate in a frame the ornamental and aesthetic appeal of interesting, unusual or fine grain of a single piece of wood is time consuming and structurally difficult unless backing and supporting members are also developed.

For oval or other nonrectangular frames, scarf joints are often employed which require a high degree of expertise. Because of these necessary joints, a natural finish of the frame shows up discontinuities in the grain of the wood which usually tends to detract from the overall aesthetic benefit.

To cut a one piece closed frame from a single sheet of material can be done freehand or with the use of a template. However, this process results in very expensive frames because the cutaway wood is generally in the nature of scrap and may or may not have further value to a frame maker. Moreover, once such a frame has been cut, problems of sufficient physical stability thereof during beveling of the front surface and routing of the rear surface to receive the picture edges arise. Because of the expertise required in fabricating such frames, only those craftsmen having a high degree of skill are capable of producing acceptable frames.

It is therefore a primary object of the present invention to provide apparatus for developing a plurality of one piece closed frames from a single sheet of material.

Another object of the present invention is to provide a plurality of nestable concentric templates for defining a plurality of different sized frames to be cut from a single sheet of material.

Yet another object of the present invention is to provide apparatus for locating in spaced apart relationship a plurality of frame templates upon a single sheet of material.

Still another object of the present invention is to provide means for spacing in predetermined relationship upon a sheet of material a plurality of concentric templates.

A further object of the present invention is to provide a means for cutting one piece frames and supporting the same during beveling of the front surface thereof.

A yet further object of the present invention is to provide a method for cutting a plurality of one piece frames from a sheet of material.

A still further object of the present invention is to provide a method for locating and attaching a plurality of concentric frame templates upon a single sheet of material.

A still further object of the present invention is to provide a method for guiding a cutting element along the interior and exterior perimeters of a frame intermediate adjacent spaced apart templates.

These and other objects of the present invention will become apparent to those skilled in the art as the description thereof proceeds.

The present invention will be described with greater specificity and clarity with reference to the following drawings, in which.

Figure 1:
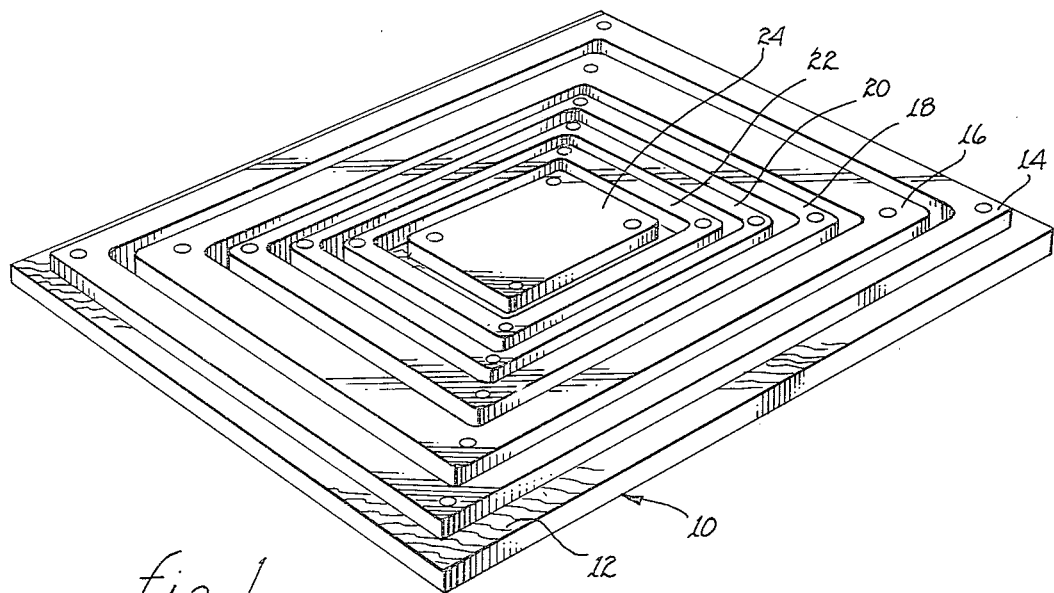
FIG. 1 is a perspective view illustrating a plurality of concentric templates mounted upon a sheet of material.

Referring to FIG. 1, there is shown a sheet of material 10 from which are to be formed a plurality of one piece closed frames. Such one piece frames have particular aesthetic appeal when the sheet of material has an interesting grain pattern (depicted by numeral 12) which is to be displayed unbroken and uninterrupted along the totality of the frame. Additionally, one piece frames do not suffer from the accepted, but none the less disturbing, discontinuity of a perceptible crack or glue joint at each junction of the pieces of a conventional frame.

Figure 2:
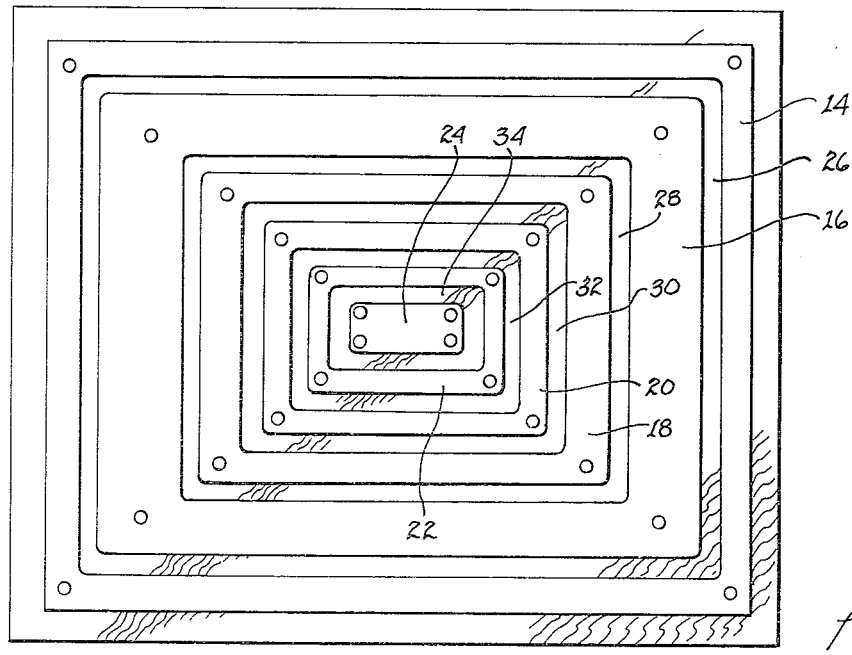
FIG. 2 is a top view of the concentric templates attached to a sheet of material.

Referring jointly to FIGS. 1 and 2, there are shown a plurality of concentric nested templates, 14, 16, 18, 20, 22 and 24. The internal dimensions of templates 14, 16, 18, 20 and 22 may correspond to conventional sized picture frames of 16"×20", 11"×14", 8"×10", 5"×7" and 3"×5", respectively. In the alternative, the templates may be of any other desired rectangular size. Furthermore, they may be oval, circular or of other special purpose configuration to best compliment the subject matter to be retained thereby and displayed therein.

The external dimensions of each of the templates is sized with respect to the adjacent circumscribing template interior dimension so as to provide a uniform spacing width therebetween, nominally ⅜". Thereby, after attachment of the templates to the sheet material a plurality of bands, 26, 28, 30, 32 and 34 of sheet material exist intermediate adjacent templates. The opposing external and internal edges of adjacent templates defining each of these bands serve as guides for locating and guiding a cutting element to cut the sheet material and sever the adjacent frames from one another.

Figure 5:
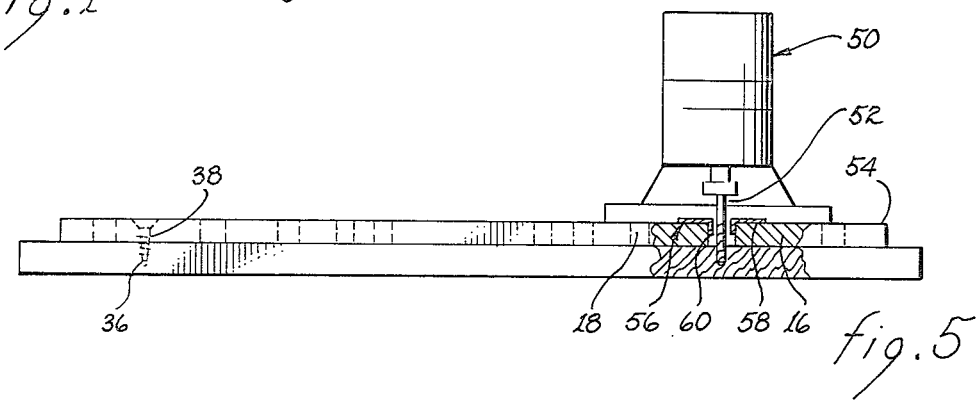
FIG. 5 is a partial cross-sectional view illustrating the relationship of a cutting element to the templates.

Each of the templates is secured to sheet material 10 by means of counter sunk screws 36 penetrating counter sunk holes 38 located at each corner of each template (see also FIG. 5). These screws rigidly engage the underlying sheet material, the adjacent surface of which forms the rear surface of the frame such that the resulting hole therein will not be visible on completion of the frame. Thereby, each of the templates is rigidly attached to sheet material 10 in a predetermined specified relationship to one another.

Figure 3:
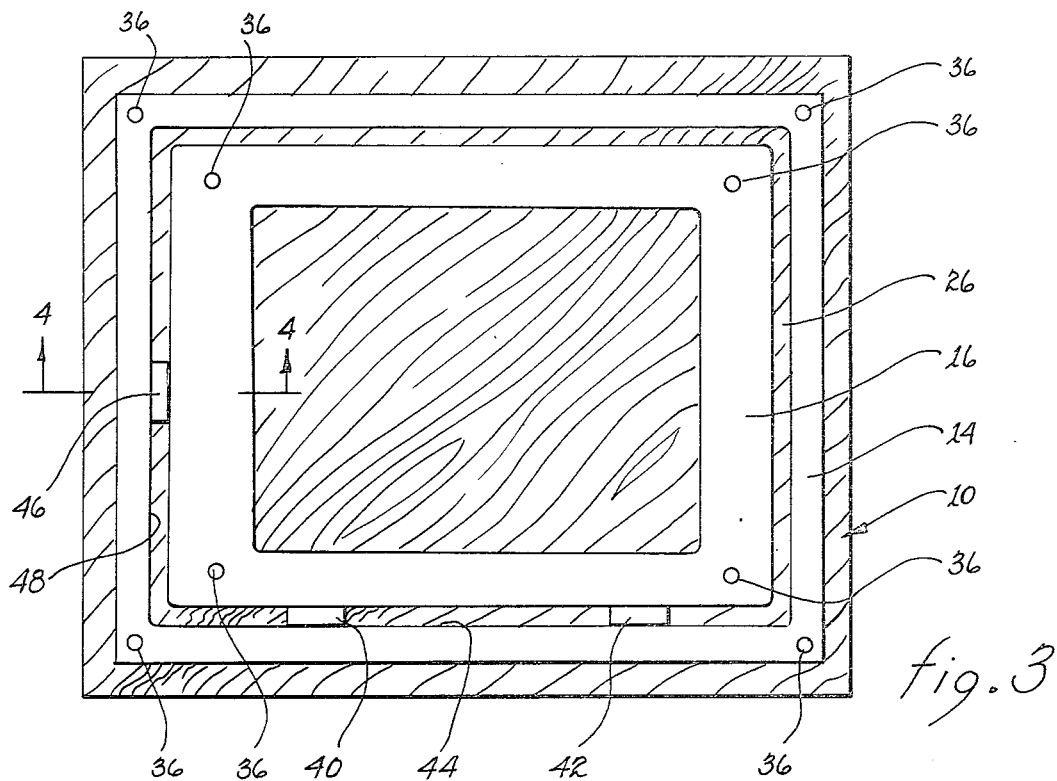
FIG. 3 illustrates the locating means for a plurality of templates.
Figure 4:
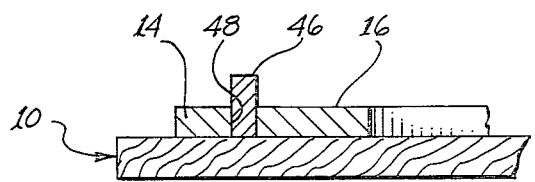
FIG. 4 is a cross-sectional view taken along lines 4—4, as shown in FIG. 3.

To insure uniformity of spacing intermediate adjacent templates, locater blocks, such as illustrated in FIGS. 3 and 4 may be employed prior to attachment of each template. After template 14 has been secured to sheet material 10 by screws 36 a pair of locater blocks 40 and 42 are placed adjacent interior edge 44 of the template. A further locater block 46 is placed adjacent interior edge 48 of the template. These locater blocks are nominally ⅝" wide. By locating template 16 in abutting relationship to blocks 40, 42 and 46, the location of this template will be centered within the interior perimeter of template 14 such that band 26 between the templates is uniformly ⅝" in width. Thereafter, template 16 is secured to sheet material 10 by screws 36. This process is repeated until all frames which are to be cut have had their corresponding templates attached to the sheet material.

The severing of the individual frames from the sheet material may be accomplished by any one of several types of cutting elements. However, certain preferred benefits are achieved by employing a router.

Figure 6:
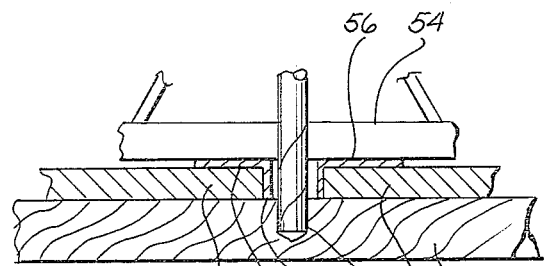
FIG. 6 is a cross-sectional view illustrating penetration of the cutting element through the sheet of material.

Turning now to FIGS. 5 and 6, there is shown a router 50 having a motor for rotatably driving a cutting element 52. A stand 54 supports the router in fixed horizontal relationship thereto; commercial stands are available which allow relative adjustment in height between the stand and the router to vertically reposition the cutting element with respect to a work piece. A commercially available guide element 56 is attached to stand 54. The guide element includes a flange 58 extending radially from a sleeve 60 which circumscribes cutting element 52 and is short enough to allow the cutting element to extend past the lower end of the sleeve.

For the embodiment of the invention described above, a guide element 56 is selected which includes a sleeve 60 having an external diameter of ⅝". Thereby, it is mateable intermediate the edges of adjacent templates and serves to guide cutting element 52 along the respective band of exposed sheet material.

From this description, it becomes apparent that adjacent frames may be severed from one another by translating router 50 along each of the exposed bands of sheet material which translation is guided by guide element 56. Thus, persons of nominal skill can readily and easily cut perfect one piece frames from a single sheet of material by employing the set of templates described.

It has been found through experience that the best results are achieved by making several intermediate cuts of increasing depth in each band before complete penetration of the sheet material by the cutting element is attempted. Were complete penetration attempted initially and if the sheet material is relatively thick, excess heating of the cutting element with attendant discoloration of the frame surface may result. Nominally, the sheet material is ¾" thick to provide an aesthetically attractive frame of sufficient robustness to serve the purpose intended.

From the above description, it may be appreciated that counter sunk screws 36 are employed to mate with counter sunk holes 38 in order to provide a planar surface at the top surface of the templates to permit stand 54 of the router to have uninterrupted passage therealong as all of the cuts are made.

The sheet material external to the outer edge of template 14 may be cut by translating router 50 along the template edge while maintaining intimate contact between the sleeve of guide member 56 with the external edge. Support for the router is provided by template and any internally concentric templates in proximity thereto. The sheet material interior of the inner edge of template 22 may be cut by maintaining sleeve 60 of guide member 56 adjacent the inner edge of this template; support for translation of stand 54 is provided by the adjacent templates in contact therewith. In the alternative, template 24 may be employed to define a band commensurate in width to that of sleeve 60.

After the individual frames have been severed from the sheet material, the front face thereof, the face opposite to that to which the templates are attached, may be beveled to the final configuration either before or after the respective template is disengaged therefrom. This choice depends primarily upon the degree of rigidity of the resulting frame and the nature and requirements of the tools employed for the beveling functions. After the front surface has been beveled the template is removed to cut the appropriate recess for attachment of the picture or other element to be supported within the frame. A backing for the picture may also be attached. The screw holes resulting from the former attachment of the template may be left as they will be on the rear surface of the frame and out of view; or, they may be filled in with putty or the like.

While the above description of the invention is centered primarily around the development of rectangular frames, it is to be understood that the invention is not limited to such configurations. In fact, the present invention is particularly well suited to the fabrication of frames which are circular, oval or of unusual configurations as the cutting of the interior and exterior edges of these frames is controlled by adjacent spaced apart templates which are configurable to any shape.

By experience it has been learned that templates of aluminum and having a thickness of approximately ½" are well suited. Such templates are relatively easily fabricated by conventional machining processes and the thickness is sufficient to allow the use of commercially available guide members. Moreover, physical stability of templates of this thickness provide sufficient support for readily bendable and elastic sheet material to prevent warping, distortion or other disconfiguration during the cutting process.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Apparatus for defining cuts to be made to obtain one piece frames from sheet material, said apparatus comprising in combination:
   (a) a plurality of concentric templates, each said template locating the interior and exterior perimeters and width of a one piece frame; and (b) means for securing each said template to the sheet material concentric with an adjacent one of said templates and spaced apart therefrom;

whereby, said adjacent spaced apart templates define continuous bands of sheet material to be cut to obtain the one piece frames.

2. The apparatus as set forth in claim 1 including means for positioning adjacent ones of said templates upon the sheet material at a predetermined spaced apart relationship.

3. The apparatus as set forth in claim 2 wherein said positioning means includes locator blocks.

4. The apparatus as set forth in claim 2 wherein said securing means comprises a plurality of countersunk holes extending through each said template to the sheet material.

5. The apparatus as set forth in claim 4 wherein said securing means includes screws with countersunk heads for penetrating said holes and threadedly engaging the sheet material, whereby said securing means does not protrude above the surface of said templates.

6. The apparatus as set forth in claim 5 wherein said templates are rectangular in plan form.

7. The apparatus as set forth in claim 1 including means for cutting the sheet material intermediate and guided by the edges of adjacent ones of said templates.

8. A method for cutting one piece frames from sheet material, said method comprising the steps of:
(a) locating each of a plurality of concentric templates upon the sheet material to define the interior and exterior perimeters and width of a frame;
(b) securing each of said templates to the sheet material;
(c) positioning a cutting tool intermediate and guided by the edges of adjacent spaced apart templates; and
(d) cutting the sheet material to form frames comporting with the templates.

9. The method as set forth in claim 8 including the step of locating concentric templates in a predetermined spaced apart relationship with removable locator members.

10. The method as set forth in claim 9 including the step of disengaging the templates from the cut frames.

11. Apparatus for cutting one piece frames from sheet material, said apparatus comprising in combination:
(a) a plurality of concentric templates for locating the interior and exterior perimeters and width of each of the one piece frames;
(b) means for securing each said template to the sheet material generally concentric with an adjacent one of said templates and spaced apart therefrom;
(c) means for cutting the sheet material to form the one piece frames in conformance with said templates; and
(d) means for positioning said cutting means intermediate and guided by the edges of adjacent spaced apart ones of said templates;

whereby, said adjacent spaced apart templates define continuous bands of sheet material to be cut to obtain the one piece frames.

12. The apparatus as set forth in claim 11 including locating members for locating generally concentric ones of said templates in relation to one another.

13. The apparatus as set forth in claim 11 wherein said positioning means includes a depending element for slidingly contacting an edge of said template and a flange extending from said depending element for bearing against a planar surface of said templates.

* * * * *